United States Patent
Ozao

(10) Patent No.: US 12,490,891 B2
(45) Date of Patent: Dec. 9, 2025

(54) ENDOSCOPE DEVICE AND ENDOSCOPE SYSTEM

(71) Applicant: OLYMPUS CORPORATION, Tokyo (JP)

(72) Inventor: Akihiko Ozao, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 592 days.

(21) Appl. No.: 17/869,212

(22) Filed: Jul. 20, 2022

(65) Prior Publication Data

US 2022/0354352 A1 Nov. 10, 2022

Related U.S. Application Data

(63) Continuation of application No. PCT/JP2020/005948, filed on Feb. 17, 2020.

(51) Int. Cl.
*A61B 1/06* (2006.01)
*A61B 1/00* (2006.01)
(Continued)

(52) U.S. Cl.
CPC ........ *A61B 1/0655* (2022.02); *A61B 1/00009* (2013.01); *A61B 1/05* (2013.01);
(Continued)

(58) Field of Classification Search
CPC ............ A61B 1/000095; A61B 6/4216; A61B 6/4225; A61B 6/425; A61B 6/48
See application file for complete search history.

(56) References Cited

U.S. PATENT DOCUMENTS 9,259,231 B2* 2/2016 Navve ................ A61B 17/2256
9,895,196 B2* 2/2018 Waisman ............... A61B 18/26
(Continued)

FOREIGN PATENT DOCUMENTS

CN 208002763 U 10/2018
EP 2 926 718 A1 10/2015
(Continued)

OTHER PUBLICATIONS

Nathaniel M. Fried. Recent advances in infrared laser lithotripsy. 2018. (Year: 2018).*
(Continued)

*Primary Examiner* — Michael J Carey
*Assistant Examiner* — Megan Elizabeth Monahan
(74) *Attorney, Agent, or Firm* — Scully, Scott, Murphy & Presser, P.C.

(57) ABSTRACT

An endoscope device includes: a light source capable of switching an optical spectrum of illumination light; an imaging device configured to acquire an image by receiving reflection light of the illumination light; an image processor configured to determine whether or not visibility deterioration has occurred within a visual field of the image acquisition section due to a fragment of a calculus crushed by being irradiated with a laser beam from a laser pulse generator; and a controller configured to control the light source based on a determination result obtained by the image processor. The controller causes the light source to emit white light as the illumination light in response to the image processor determining that the visibility deterioration has not occurred, and switches the illumination light emitted from the light source to light in a blue region in response to the image processor determining that the visibility deterioration has occurred.

20 Claims, 8 Drawing Sheets

(51) Int. Cl.
  *A61B 1/05* (2006.01)
  *A61B 1/07* (2006.01)
  *A61B 18/24* (2006.01)
  *A61B 17/00* (2006.01)
  *A61B 18/00* (2006.01)

(52) U.S. Cl.
  CPC .............. *A61B 1/06* (2013.01); *A61B 1/0638* (2013.01); *A61B 1/0646* (2013.01); *A61B 1/0669* (2013.01); *A61B 1/0684* (2013.01); *A61B 1/07* (2013.01); *A61B 18/245* (2013.01); *A61B 2017/00061* (2013.01); *A61B 2018/00779* (2013.01); *A61B 2018/00982* (2013.01)

(56) References Cited

U.S. PATENT DOCUMENTS

| | | | |
|---|---|---|---|
| 2009/0118578 A1* | 5/2009 | Takasugi | A61B 5/0084 600/109 |
| 2015/0272422 A1 | 10/2015 | Aoyama | |
| 2015/0320433 A1 | 11/2015 | Navve et al. | |
| 2016/0051133 A1 | 2/2016 | Ubayama et al. | |
| 2016/0324398 A1 | 11/2016 | Sasaki | |
| 2016/0361120 A1* | 12/2016 | Brinkmann | A61B 18/20 |
| 2017/0172387 A1 | 6/2017 | Matsui et al. | |
| 2018/0344405 A1* | 12/2018 | Brown | A61B 18/22 |
| 2019/0073769 A1 | 3/2019 | Watanabe | |
| 2021/0038311 A1* | 2/2021 | Shelton | A61B 5/201 |

FOREIGN PATENT DOCUMENTS

| | | |
|---|---|---|
| EP | 2 982 290 A1 | 2/2016 |
| EP | 3 097 841 A1 | 11/2016 |
| EP | 3 449 800 A1 | 3/2019 |
| JP | 2013-135933 A | 7/2013 |
| JP | 2015-136470 A | 7/2015 |
| JP | 2015-195844 A | 11/2015 |
| JP | 2017-522058 A | 8/2017 |
| JP | 2019-042157 A | 3/2019 |
| WO | 2015/019957 A1 | 2/2015 |
| WO | 2015/175151 A1 | 11/2015 |
| WO | 2016/185734 A1 | 11/2016 |
| WO | 2018/207539 A1 | 11/2018 |

OTHER PUBLICATIONS

International Search Report dated Apr. 7, 2020 received in PCT/JP2020/005948.

Christopher R. Wilson, et al., "Novel Ureteroscope Illumination Designs", Proceedings of SPIE, vol. 10038, Therapeutics and Diagnostics in Urology: Lasers, Robotics, Minimally Invasive, and Advanced Biomedical Devices; 100380P, 2017, pp. 100380P.1-100380P.7, https://doi.org/10.1117/12.2247598Event: SPIE BiOS, 2017, San Francisco, California, United States.

K. Haberman, et al., "A Dual-Channel Flexible Ureteroscope: Evaluation of Deflection, Flow, Illumination, and Optics", Journal of Endourology, vol. 25, No. 9, pp. 1411-1414, Sep. 2011.

N. M. Fried, "Recent advances in infrared laser lithotripsy [Invited]", Biomedical Optics Express, vol. 9, No. 9, pp. 4552-4568, https://doi.org/10.1364/BOE.9.004552, Sep. 2018.

* cited by examiner

FFT IMAGE

ENDOSCOPE DEVICE AND ENDOSCOPE SYSTEM

CROSS-REFERENCE TO RELATED APPLICATIONS

This is a continuation of International Application PCT/JP2020/005948, with an international filing date of Feb. 17, 2020, which is hereby incorporated by reference herein in its entirety.

TECHNICAL FIELD

The present invention relates to endoscope devices and endoscope systems.

BACKGROUND ART

In recent years, a so-called dusting technique for crushing a calculus into fine particles is attracting attention in transurethral ureterolithotripsy (TUL) using a ureteroscope. In dusting, the calculus can be discharged outside the body together with a perfusate, but illumination light is scattered by calculus fragments floating during the crushing process, resulting in poor visibility of the endoscope.

In the related art, a known endoscope device that performs dusting while ensuring visibility includes a liquid-discharging channel in addition to a channel used for emitting illumination light. This endoscope device efficiently discharges calculus fragments outside the body by increasing the amount of perfusate (for example, see Non Patent Literature 1).

CITATION LIST

Non Patent Literature

{NPL 1}
Haberman, Ken, et al. "A Dual-Channel Flexible Ureteroscope: Evaluation of Deflection, Flow, Illumination, and Optics." Journal of Endourology 25.9 (2011): 1411-1414

SUMMARY OF INVENTION

A first aspect of the present invention is directed to an endoscope device comprising: a light source capable of switching an optical spectrum of illumination light; an imaging device configured to acquire an image by receiving reflection light of the illumination light; an image processor configured to determine whether or not visibility deterioration has occurred within a visual field of the image acquisition section due to a fragment of a calculus crushed by being irradiated with a laser beam from a laser pulse generator; and a controller configured to control the light source based on a determination result obtained by the image processor, wherein the controller causes the light source to emit white light as the illumination light in response to the image processor determining that the visibility deterioration has not occurred, and switches the illumination light emitted from the light source to light in a blue region in response to the image processor determining that the visibility deterioration has occurred.

A second aspect of the present invention is directed to an endoscope system comprising a laser pulse generator configured to radiate a laser beam onto a calculus and an endoscope device comprising: a light source capable of switching an optical spectrum of illumination light; an imaging device configured to acquire an image by receiving reflection light of the illumination light; an image processor configured to determine whether or not visibility deterioration has occurred within a visual field of the image acquisition section due to a fragment of a calculus crushed by being irradiated with a laser beam from a laser pulse generator; and a controller configured to control the light source based on a determination result obtained by the image processor, wherein the controller causes the light source to emit white light as the illumination light in response to the image processor determining that the visibility deterioration has not occurred, and switches the illumination light emitted from the light source t determining o light in a blue region in response to the image processor that the visibility deterioration has occurred.

A third aspect of the present invention is directed to a method for switching an illumination light of an endoscope device, the method comprising: determining whether or not visibility deterioration due to a fragment of a calculus has occurred within a visual field; in response to determining that the visibility deterioration has not occurred, emitting white light as the illumination light; and in response to determining that the visibility deterioration has occurred, switching the illumination light to light in a blue region.

DESCRIPTION OF EMBODIMENTS

First Embodiment

An endoscope device and an endoscope system according to a first embodiment of the present invention will be described below with reference to the drawings.

Figure 1:
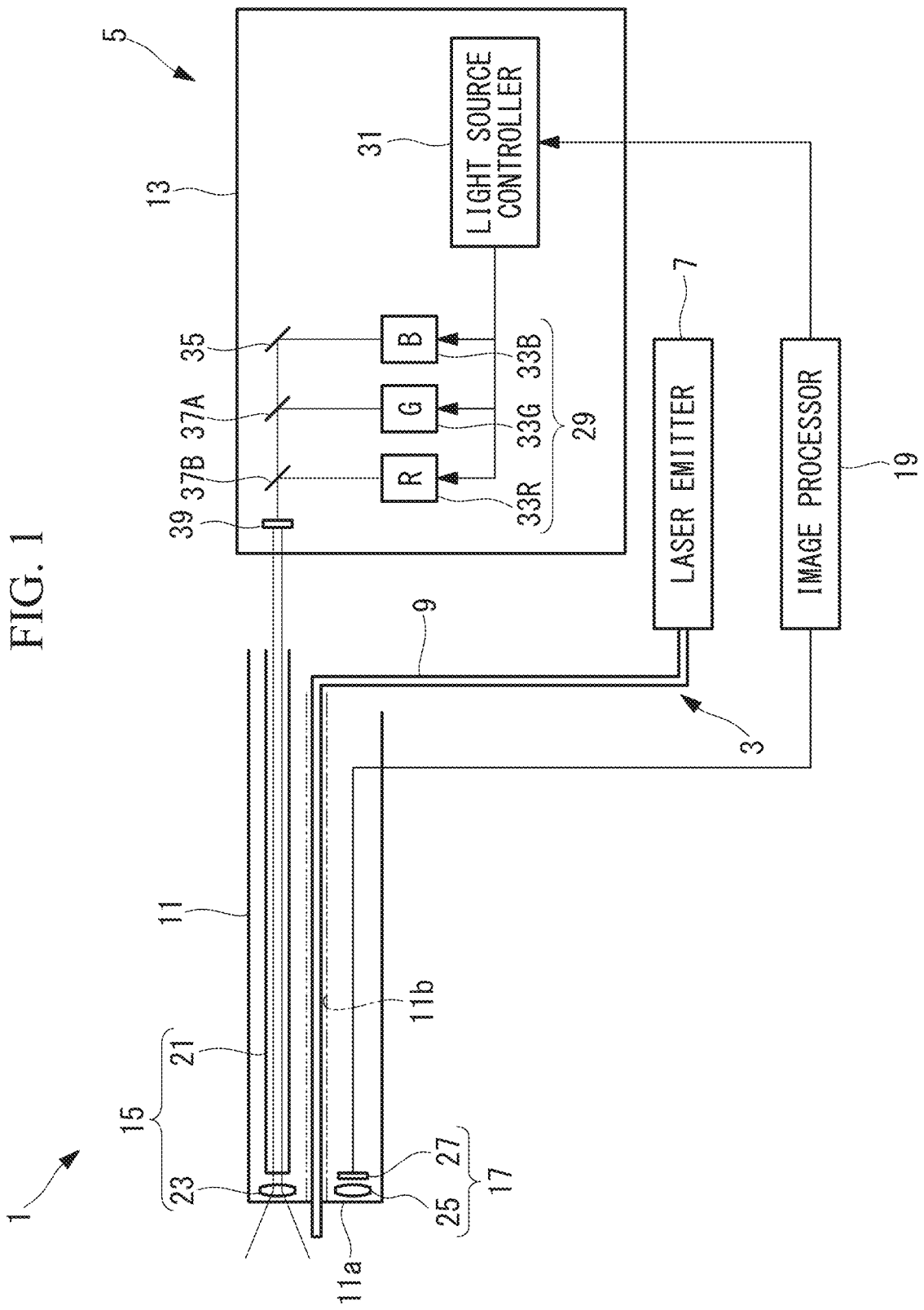
FIG. 1 illustrates the overall configuration of an endoscope system according to a first embodiment of the present invention.

As shown in FIG. 1, an endoscope system 1 according to this embodiment includes a laser pulse generator 3 used for treating, for example, a urinary calculus and an endoscope device 5 used for observing an observation area inside the body cavity of a patient.

The laser pulse generator 3 radiates a laser beam onto the calculus inside the body cavity of the patient so as to shatter the calculus. The laser pulse generator 3 includes a laser emitter 7 that emits the laser beam and a laser guide 9 that guides the laser beam emitted from the laser emitter 7 into the body cavity of the patient. The laser emitter 7 has a variable laser pulse width so as to be capable of crushing the calculus into relatively large fragments (fragmentation) or crushing a calculus into fine particles (dusting).

The endoscope device 5 includes a narrow flexible insertion section 11 to be inserted into the body of the patient, a light source unit (light source) 13 that generates illumination light, an illumination unit 15 that radiates the illumination light emitted from the light source unit 13 toward the observation area, an image acquisition unit 17 that acquires image information about the observation area irradiated with the illumination light, and an image processor (determination unit or calculator) 19 that processes the image information acquired by the image acquisition unit 17. The endoscope device 5 is connected to a monitor (not shown) that displays an endoscopic image (image) generated by the image processor 19.

The illumination unit 15 includes a light guide fiber 21 disposed in the longitudinal direction within the insertion section 11, and also includes an illumination optical system 23 disposed at a distal end 11a of the insertion section 11.

The light guide fiber 21 optically guides the illumination light emitted from the light source unit 13 from the proximal end to near the distal end 11a of the insertion section 11.

The illumination optical system 23 radiates the illumination light emitted from the distal end of the light guide fiber 21 onto the observation area facing the distal end 11a of the insertion section 11.

The image acquisition unit 17 is provided near the distal end 11a of the insertion section 11. The image acquisition unit 17 includes an objective lens 25 that collects feedback light (reflection light) returning from the observation area irradiated with the illumination light, and also includes an imaging device (image acquisition section) 27, such as a CCD (charge-coupled device), that acquires an image of the feedback light collected by the objective lens 25. The image information acquired by the imaging device 27 is transmitted to the image processor 19.

The insertion section 11 is provided with a channel 11b extending through the insertion section 11 in the longitudinal direction. The laser guide 9 of the laser pulse generator 3 extends through the channel 11b. The laser guide 9 extending through the channel 11b protrudes from the distal end 11a of the insertion section 11 so as to be disposed at a position facing the calculus inside the body cavity. The laser beam optically guided by the laser guide 9 from the laser emitter 7 is radiated onto the calculus.

The channel 11b is also used for delivering a perfusate for ensuring visibility through the endoscope device 5. The proximal end of the channel 11b is connected to a liquid delivery means, such as a syringe or a pump (not shown). The liquid delivery means discharges the perfusate from the distal end 11a of the insertion section 11 via the channel 11b.

The image processor 19 generates an endoscopic image of the observation area based on the image information transmitted from the imaging device 27. Furthermore, the image processor 19 determines whether or not visibility deterioration has occurred within the visual field of the imaging device 27 due to the effect of the fragments, that is, calculus fragments, of the calculus crushed by the laser pulse generator 3.

For example, the image processor 19 determines whether or not visibility deterioration has occurred due to the calculus fragments based on a parameter related to the amount of high-frequency components having a sptial frequency higher than a predetermined frequency in the endoscopic image acquired by the imaging device 27. A method performed by the image processor 19 for determining whether or not visibility deterioration has occurred will be described in detail below.

The image processor 19 performs a Fourier transform on a brightness signal of the generated endoscopic image and calculates a ratio between an integrated value of spatial frequency spectrum components having a frequency higher than a predetermined threshold value and an integrated value of spatical frequency spectrum components having a frequency lower than the predetermined threshold value. Accordingly, it can be determined whether the endoscopic image contains a large amount of the structure having the high-frequency components or a large amount of the structure having the low-frequency components. If there is a large amount of the structure having the high-frequency components, the visual field of the imaging device 27 is blurry.

Figure 2:
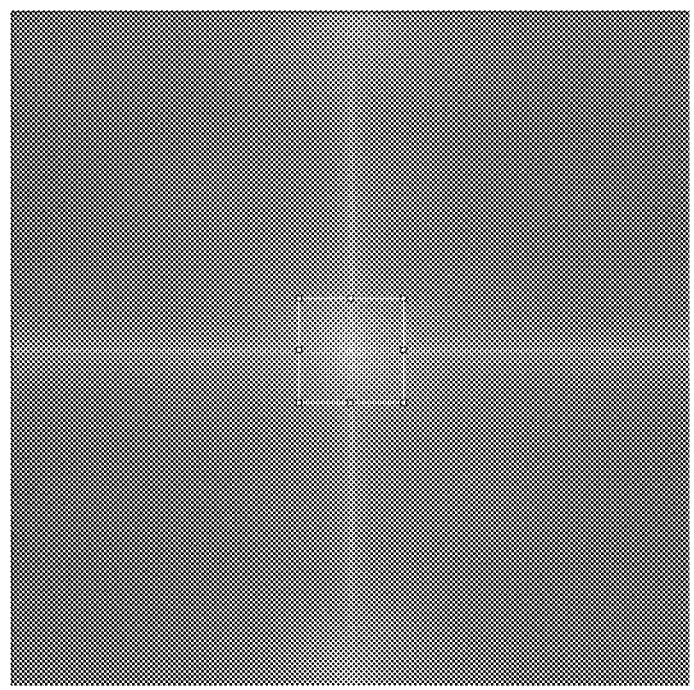
FIG. 2 illustrates an area with a spatial frequency of 52 cycles/L in an FFT image.

The length (i.e., the number of pixels) of each of the opposite horizontal sides of the endoscopic image is defined as L, the integrated value of the spatial frequency spectrum components with the frequency lower than the predetermined threshold value is defined as Sl, and the integrated value of the spatial frequency spectrum components with the frequency higher than or equal to the predetermined threshold value is defined as Sh. In a case where Sh/Sl≥20, the image processor 19 determines that the endoscopic image contains a large amount of the structure having the high-frequency components and that visibility deterioration has occurred due to the calculus fragments. In a case where Sh/Sl<20, the image processor 19 determines that the endoscopic image contains a large amount of the structure having the low-frequency components and that visibility deterioration due to calculus fragments has not occurred. An example of the predetermined threshold value used may be a spatial frequency of 52 cycles/L as an experimentally-obtained value. FIG. 2 illustrates an example of an FFT image (fast Fourier transform image). In FIG. 2, an area surrounded by a rectangular frame indicates an area with the frequency of 52 cycles/L.

The light source unit 13 includes an LED light source 29 capable of changing the color of light to be emitted, and also includes a light source controller 31 that controls the LED light source 29.

The LED light source 29 includes a B-LED 33B having a peak intensity in the blue wavelength region, a G-LED 33G having a peak intensity in the green wavelength region, and an R-LED 33R having a peak intensity in the red wavelength region.

Furthermore, the light source unit 13 includes a mirror 35 and dichroic mirrors 37A and 37B that synthesize white illumination light by combining illumination light beams emitted from the LEDs 33B, 33G, and 33R, and also includes a focusing lens 39 that focuses the synthesized white illumination light onto an input end of the light guide fiber 21 so as to cause the white illumination light to enter the light guide fiber 21.

The light source controller 31 receives the determination result obtained by the image processor 19. The light source controller 31 controls the output from each of the LEDs 33B, 33G, and 33R so as to switch the optical spectrum of white light generated from the light source unit 13. In detail, if the light source controller 31 receives, from the image processor 19, a determination result indicating that visibility deterioration due to calculus fragments has not occurred, the light source controller 31 drives the LEDs 33B, 33G, and 33R to cause the light source unit 13 to emit white illumination light.

Figure 3:
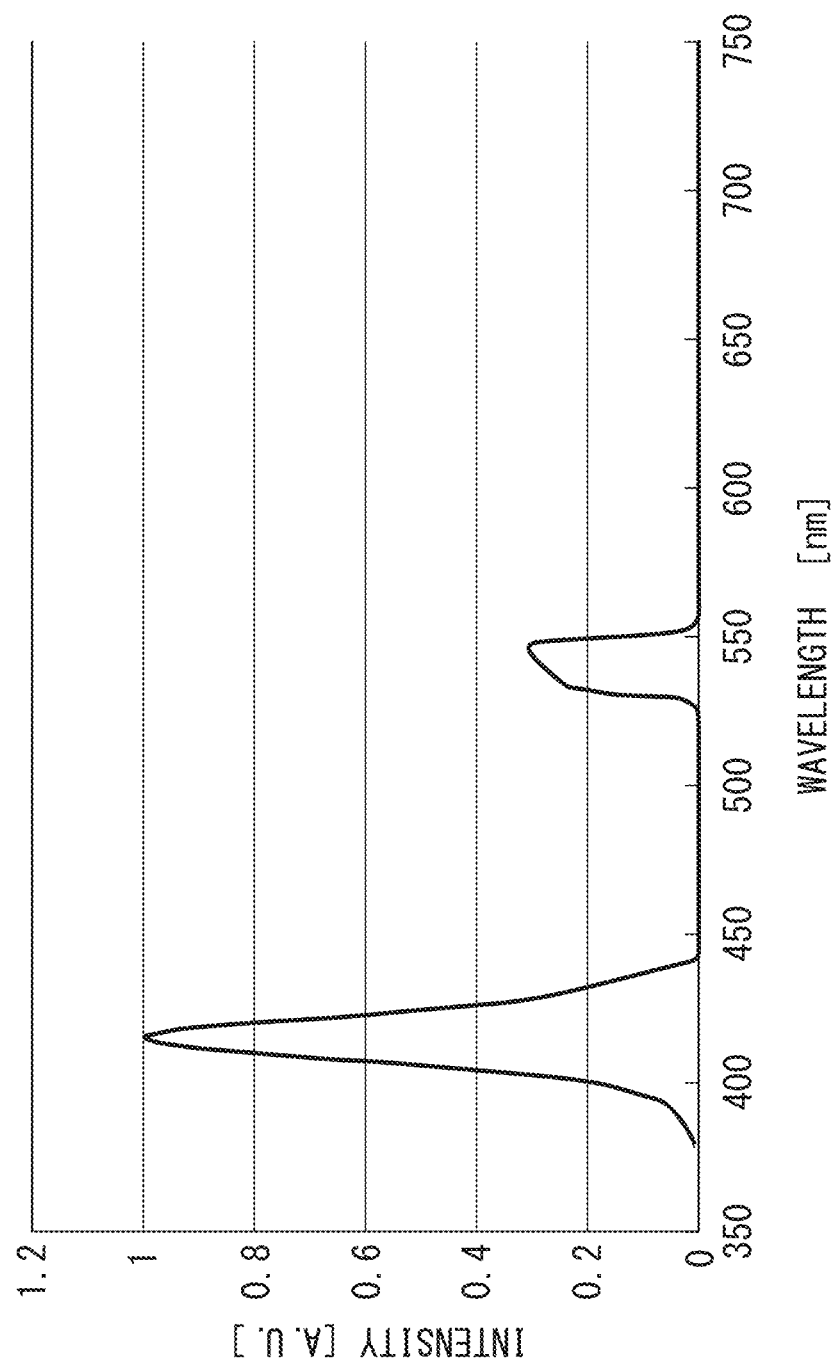
FIG. 3 illustrates an example of an optical spectrum of illumination light radiated by an endoscope device in FIG. 1 when visibility deterioration has occurred.

In contrast, if the light source controller 31 receives, from the image processor 19, a determination result indicating that visibility deterioration has occurred due to calculus fragments, the light source controller 31 increases the amount of light emitted from the B-LED 33B and decreases the amount of light emitted from the G-LED 33G and the R-LED 33R, thereby switching the illumination light emitted from the light source unit 13 to light in the blue region. If the light source controller 31 increases the amount of light emitted from the B-LED 33B while decreasing the amount of light emitted from the G-LED 33G and not driving the R-LED 33R, for example, light in the blue region whose wavelength corresponding to the highest intensity is 500 nm or smaller is emitted from the light source unit 13, as shown in FIG. 3. In FIG. 3, the ordinate axis indicates the intensity (A.U.) of the illumination light, whereas the abscissa axis indicates the wavelength (nm) of the illumination light. The same applies to FIG. 6.

The image processor 19 and the light source controller 31 are implemented by at least one processor comprising hardware and a storage device. Specifically, the storage device has an image processing program and a light-source control program stored therein. The processor causes the image processor 19 to execute the above-described process in accordance with the image processing program, and causes the light source controller 31 to execute the above-described control of the LEDs 33B, 33G, and 33R in accordance with the light-source control program. The image processor 19 and the light source controller 31 may each include a processor and a storage unit.

Next, the operation of the endoscope system 1 according to this embodiment will be described below.

In order to treat, for example, a urinary calculus by using the endoscope system 1 according to this embodiment, the insertion section 11 is first inserted into the ureter through the ureteral orifice in the urinary bladder of the patient, and the light source controller 31 causes the light source unit 13 to emit white illumination light. In this case, a perfusate for ensuring visibility through the endoscope device 5 is discharged from the distal end 11a of the insertion section 11 by the liquid delivery means.

The light guide fiber 21 optically guides the illumination light emitted from the light source unit 13 to near the distal end 11a of the insertion section 11. Then, the illumination optical system 23 radiates the illumination light emitted from the distal end of the light guide fiber 21 onto the observation area in the ureter facing the distal end 11a of the insertion section 11.

Feedback light returning from the observation area in the ureter as a result of the observation area being irradiated with the white illumination light is collected by the objective lens 25, and an image of the feedback light is subsequently acquired by the imaging device 27. Accordingly, image information of the observation area in the ureter is acquired by the imaging device 27, and an endoscopic image inside the ureter is generated by the image processor 19. The generated endoscopic image is displayed on the monitor.

Subsequently, an operator causes the laser guide 9 to face the calculus in the ureter while viewing the endoscopic image displayed on the monitor. Then, the laser pulse generator 3 is driven to radiate a laser beam onto the calculus, thereby crushing the calculus.

Figure 4:
FIG. 4 illustrates an example of an endoscopic image when visibility deterioration has occurred.

When the illumination light of the endoscope device 5 is scattered by calculus fragments, the visibility of the imaging device 27 deteriorates, as shown in, for example, FIG. 4. For example, if the illumination light is reflected and scattered by calculus fragments relatively large enough to be viewable with the naked eye, many glittering bright spots form in the endoscopic image. When the illumination light is back-scattered due to Mie scattering by fine calculus fragments not viewable with the naked eye, the endoscopic image becomes blurry.

A calculus is often brown or yellow and has low reflectance, as spectral reflectance, with respect to light in the blue region. Furthermore, the intensity of back-scattering due to Mie scattering decreases when the wavelength of the illumination light is shorter than the diameter of each calculus fragment. Therefore, when visibility deterioration has occurred due to calculus fragments, it is desirable to perform the observation by using illumination light in the blue region where the reflectance and the intensity of back-scattering from the calculus fragments are low. On the other hand, since light in the blue region changes the color of the endoscopic image, it is desirable to perform the observation by using white light during normal observation in which visibility deterioration due to calculus fragments has not occurred.

In the endoscope device 5, the image processor 19 determines whether or not visibility deterioration has occurred due to calculus fragments crushed by the laser pulse generator 3 within the visual field of the imaging device 27. In detail, of the integrated values of the spatial frequency spectrum components in the brightness signal of the generated endoscopic image, the ratio between the integrated value Sl of the spatial frequency spectrum components with the frequency lower than 52 cycles/L and the integrated value Sh of the frequency spectrum components with the frequency higher than or equal to 52 cycles/L is calculated by the image processor 19. Then, the image processor 19 determines that visibility deterioration has occurred if Sh/Sl≥20, and determines that visibility deterioration has not occurred if Sh/Sl<20.

If the image processor 19 determines that visibility deterioration due to calculus fragments has not occurred within the visual field of the imaging device 27, the light source controller 31 continues to emit the white illumination light from the light source unit 13. Accordingly, the color of the endoscopic image can be ensured.

In contrast, if the image processor 19 determines that visibility deterioration has occurred due to calculus fragments within the visual field of the imaging device 27, the light source controller 31 switches the illumination light emitted from the light source unit 13 to light in the blue region. Accordingly, visibility deterioration caused by calculus fragments is suppressed, and the visibility of the endoscope device 5 is ensured.

As described above, in the endoscope system 1 according to this embodiment, the image processor 19 determines whether or not visibility deterioration has occurred due to calculus fragments within the visual field of the imaging device 27. If it is determined that visibility deterioration has occurred, the light source controller 31 automatically switches the illumination light emitted from the light source unit 13 from white illumination light to light in the blue region. Accordingly, during normal observation in which visibility deterioration due to calculus fragments has not occurred, the color of the endoscopic image can be ensured. When visibility deterioration has occurred due to calculus fragments, visibility can be ensured with a simple operation without increasing the amount of perfusate.

This embodiment may be modified as follows.

Figure 5:
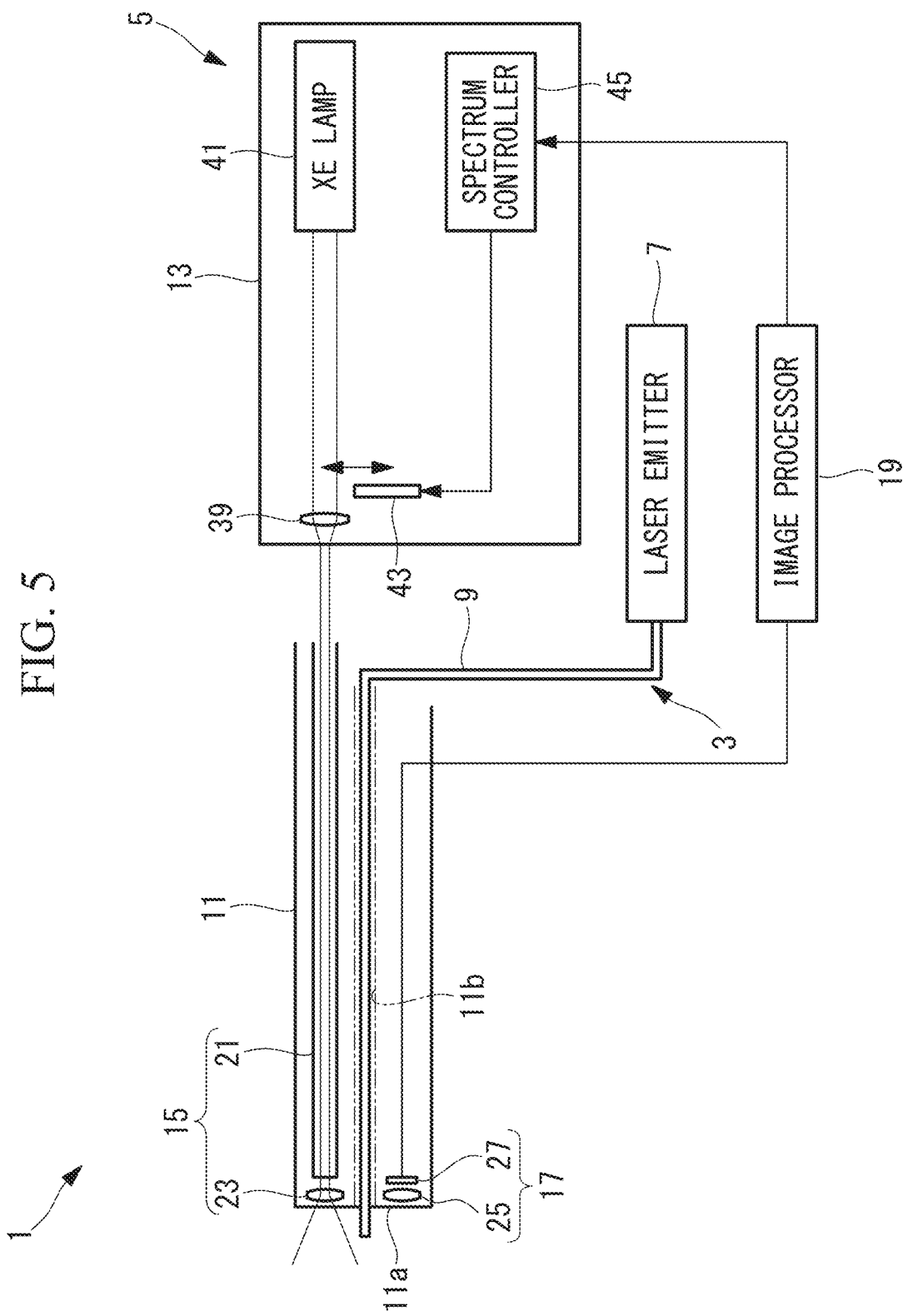
FIG. 5 illustrates the overall configuration of an endoscope system according to a modification of the first embodiment of the present invention.

In this embodiment, the light source unit 13 includes the plurality of LEDs 33B, 33G, and 33R, and the light source controller 31 controls the output from each of the LEDs 33B, 33G, and 33R. Alternatively, for example, as shown in FIG. 5, the light source unit 13 may include a xenon lamp (Xe lamp) 41 and an interference filter 43 disposed in such a manner as to be insertable in and retractable from the optical path of illumination light emitted from the xenon lamp 41.

Furthermore, in place of the light source controller 31, the light source unit 13 may include a spectrum controller (controller) 45 that controls the insertion and retraction of the interference filter 43. The spectrum controller 45 may switch the optical spectrum of the illumination light by inserting and retracting the interference filter 43 into and from the optical path of the illumination light emitted from the xenon lamp 41.

The spectrum controller 45 receives a determination result obtained by the image processor 19. The spectrum controller 45 may be implemented by the processor and the storage device mentioned above. Specifically, the storage device may have a spectrum control program stored therein. The processor may cause the spectrum controller 45 to execute the aforementioned control in accordance with the spectrum control program. The spectrum controller 45 may include a processor and a storage unit.

Figure 6:
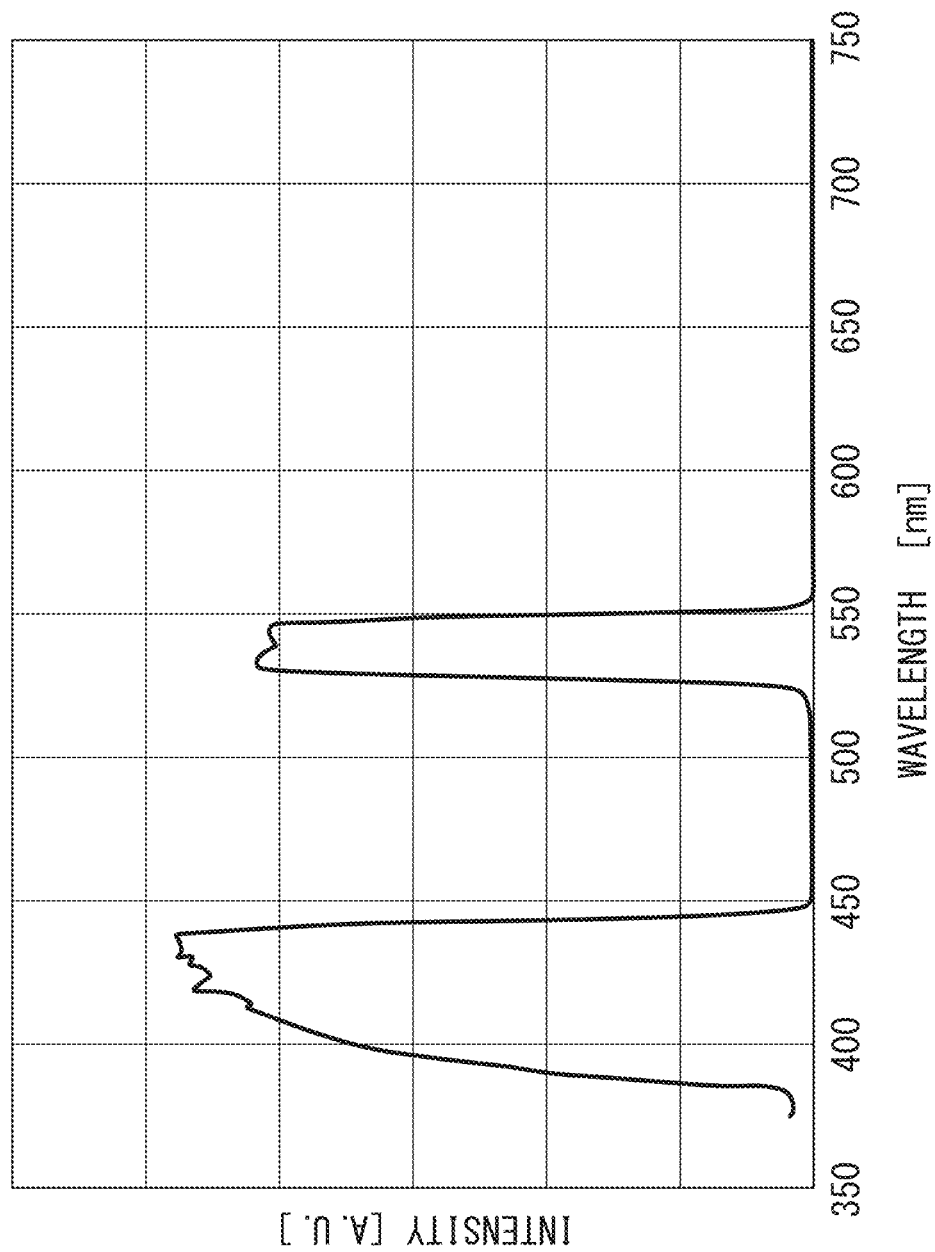
FIG. 6 illustrates an example of an optical spectrum of illumination light radiated by an endoscope device in FIG. 5 when visibility deterioration has occurred.

An example of the interference filter 43 used is a bandpass filter having a function for blocking wavelengths in a region other than the blue region. When the interference filter 43 is inserted into the optical path of the illumination light emitted from the xenon lamp 41, for example, light in the blue region whose wavelength corresponding to the highest intensity is 500 nm or smaller is emitted from the light source unit 13, as shown in FIG. 6.

If the image processor 19 determines that visibility deterioration due to calculus fragments has not occurred within the visual field of the imaging device 27, the spectrum controller 45 retracts the interference filter 43 from the optical path of the illumination light. Accordingly, the white illumination light emitted from the xenon lamp 41 is directly emitted from the light source unit 13 and is radiated onto the observation area.

In contrast, if the image processor 19 determines that visibility deterioration has occurred due to calculus fragments within the visual field of the imaging device 27, the spectrum controller 45 inserts the interference filter 43 into the optical path of the illumination light. Accordingly, of the illumination light emitted from the xenon lamp 41, only the light in the blue region transmitted through the interference filter 43 is emitted from the light source unit 13 and is radiated onto the observation area.

According to this modification, the spectrum controller 45 automatically switches the insertion and retraction of the interference filter 43 between when normal observation is to be performed and when visibility deterioration occurs, so that white illumination light is radiated during the normal observation and illumination light in the blue region is radiated during the occurrence of visibility deterioration. Accordingly, with a simple operation, the color of the endoscopic image can be ensured during normal observation in which visibility deterioration due to calculus fragments has not occurred, and visibility can be ensured without increasing the amount of perfusate when visibility deterioration has occurred due to calculus fragments.

Second Embodiment

Next, an endoscope system according to a second embodiment of the present invention will be described.

Figure 7:
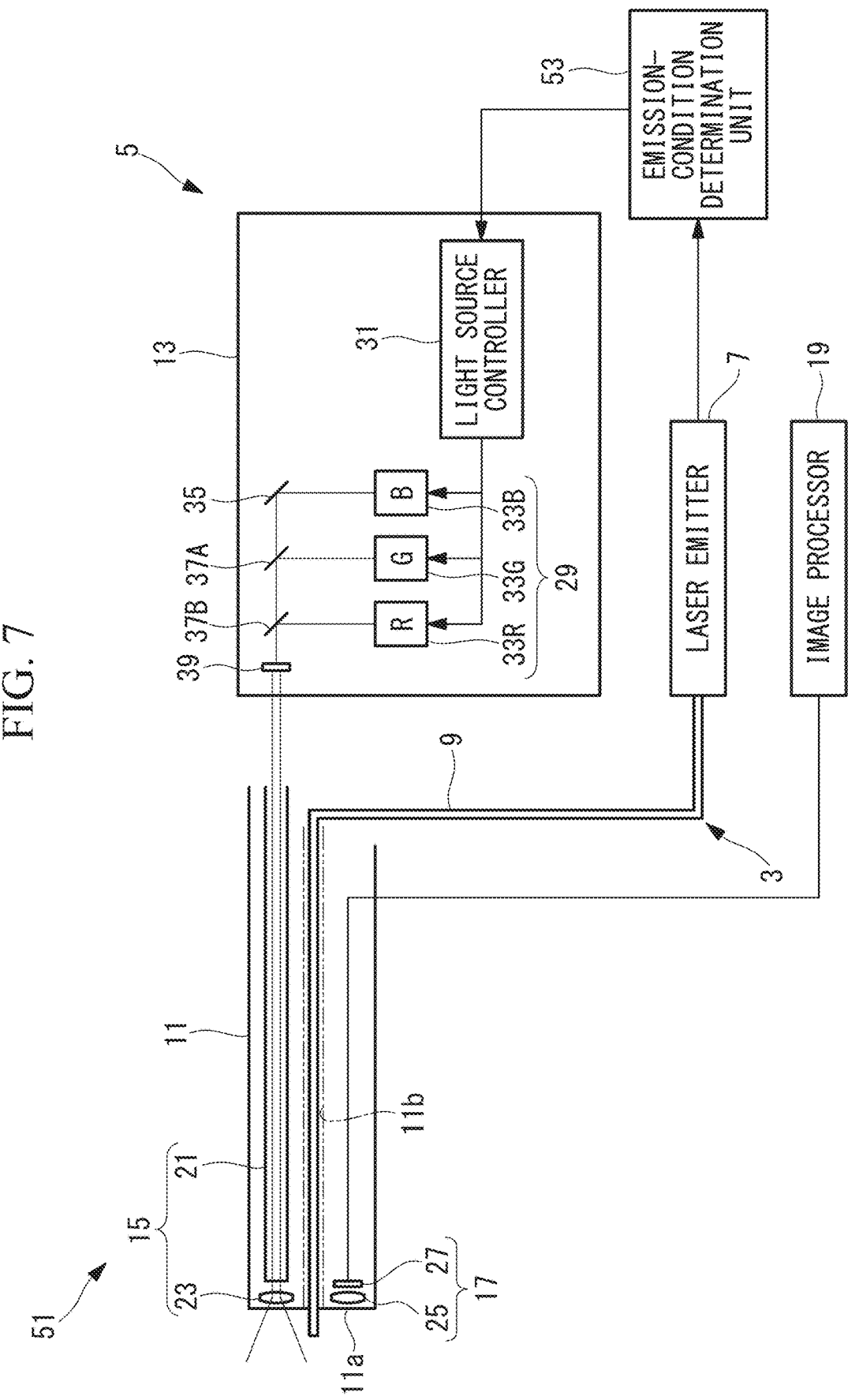
FIG. 7 illustrates the overall configuration of an endoscope system according to a second embodiment of the present invention.

As shown in FIG. 7, an endoscope system 51 according to this embodiment is different from the first embodiment in that the endoscope system 51 includes an emission-condition determination unit (determination unit) 53 that determines the emission conditions of a laser beam from the laser emitter 7.

Components identical to those in the endoscope system 1 according to the first embodiment will be given the same reference signs, and descriptions thereof will be omitted.

The emission-condition determination unit 53 determines whether or not visibility deterioration has occurred due to calculus fragments based on the emission conditions of a laser beam emitted from the laser pulse generator 3. In detail, the emission-condition determination unit 53 determines whether or not the emission conditions of the laser emitter 7 satisfy conditional expressions (1) to (3) indicated below.

Then, the emission-condition determination unit 53 determines that visibility deterioration has occurred if the emission conditions of the laser emitter 7 satisfy all of conditional expressions (1) to (3), and determines that visibility deterioration has not occurred if the emission conditions of the laser emitter 7 do not satisfy any one of conditional expressions (1) to (3).

The wavelength of the laser beam emitted from the laser emitter 7 ranges between 1900 nm and 3000 nm (1)

The energy of the laser beam emitted from the laser emitter 7 ranges between 200 mJ and 400 mJ (2)

The frequency of the laser beam emitted from the laser emitter 7 ranges between 50 Hz and 80 Hz (3)

The emission-condition determination unit 53 is implemented by the processor and the storage device mentioned above. Specifically, the storage device has an emission control program stored therein. The processor may cause the emission-condition determination unit 53 to execute the aforementioned control in accordance with the emission control program. The emission-condition determination unit 53 may include a processor and a storage unit. The determination result obtained by the emission-condition determination unit 53 is transmitted to the light source controller 31.

If the determination result received from the emission-condition determination unit 53 indicates that visibility deterioration has not occurred, the light source controller 31 drives the LEDs 33B, 33G, and 33R to cause the light source unit 13 to emit white illumination light. If the determination result received from the emission-condition determination unit 53 indicates that visibility deterioration has occurred, the light source controller 31 increases the amount of light emitted from the B-LED 33B and decreases the amount of light emitted from the G-LED 33G and the R-LED 33R, thereby switching the illumination light emitted from the light source unit 13 to light in the blue region.

When the laser-beam emission conditions satisfy all of conditional expressions (1) to (3), the calculus can be crushed into relatively small particles. If the calculus fragments are relatively small particles, there is a high possibility of the endoscopic image being blurry. On the other hand, if the laser-beam emission conditions do not satisfy any one of conditional expressions (1) to (3), the calculus fragments are less likely to be relatively small particles, so that there is a low possibility of the endoscopic image being blurry.

With the endoscope system 51 according to this embodiment, when the emission conditions of the laser emitter 7 satisfy all of conditional expressions (1) to (3), it is determined that visibility deterioration has occurred due to calculus fragments, and the light source controller 31 automatically switches the illumination light emitted from the light source unit 13 to light in the blue region. Accordingly, when visibility deterioration due to calculus fragments has not occurred, the color of the endoscopic image can be ensured. When visibility deterioration has occurred due to calculus fragments, visibility can be ensured with a simple operation without increasing the amount of perfusate.

This embodiment may be modified as follows.

Figure 8:
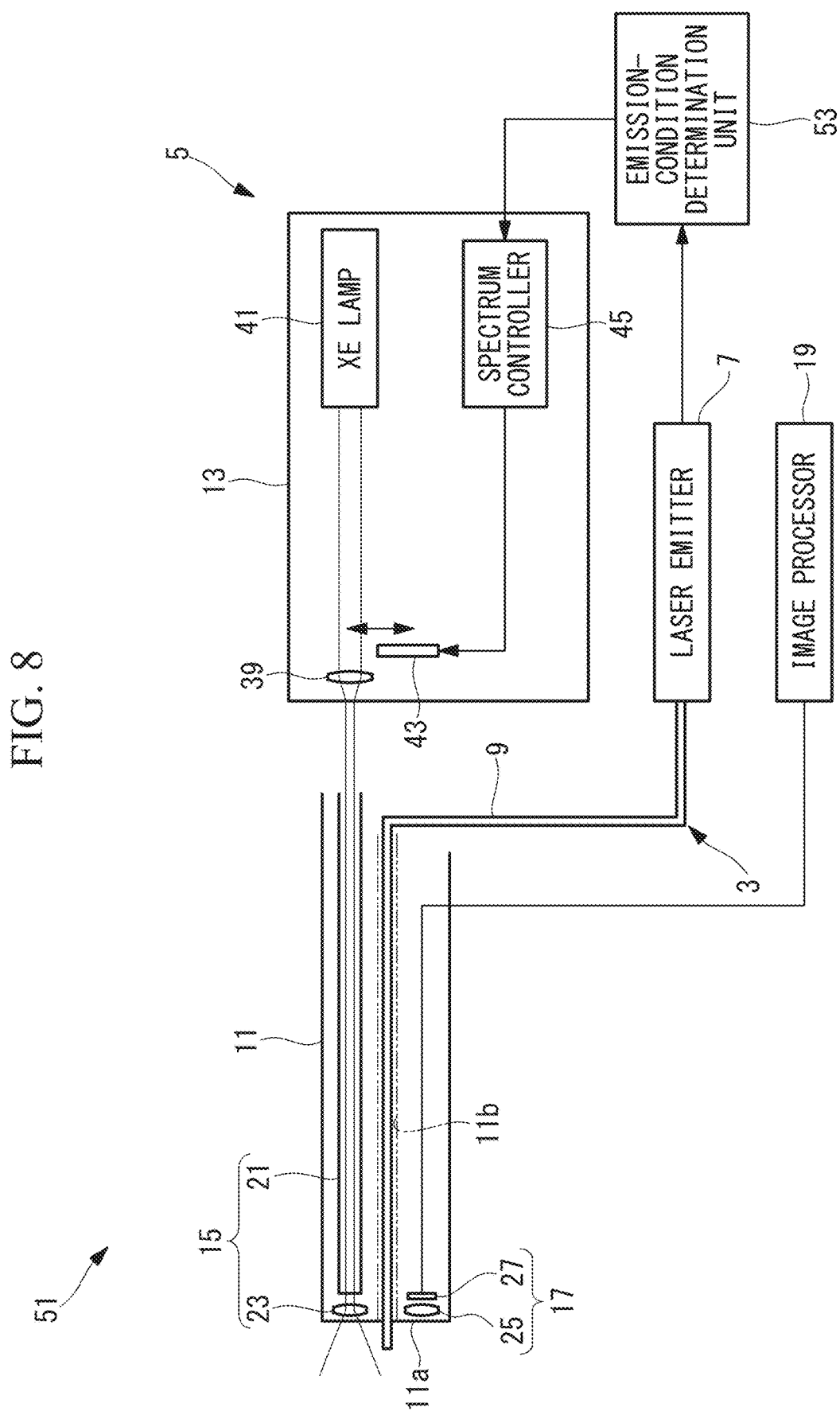
FIG. 8 illustrates the overall configuration of an endoscope system according to a modification of the second embodiment of the present invention.

In this embodiment, for example, as shown in FIG. 8, the light source unit 13 may include the xenon lamp 41 and the interference filter 43, and may also include the spectrum controller (controller) 45 in place of the light source controller 31. In accordance with a determination result obtained by the emission-condition determination unit 53, the spectrum controller 45 may insert and retract the interference filter 43 into and from the optical path of illumination light emitted from the xenon lamp 41, so as to switch the optical spectrum of the illumination light.

Specifically, the emission-condition determination unit 53 may determine that visibility deterioration has occurred if the emission conditions of the laser emitter 7 satisfy all of conditional expressions (1) to (3), and the spectrum controller 45 may insert the interference filter 43 into the optical path of the illumination light. In contrast, the emission-condition determination unit 53 may determine that visibility deterioration has not occurred if the emission conditions of the laser emitter 7 do not satisfy any one of conditional expressions (1) to (3), and the spectrum controller 45 may retract the interference filter 43 from the optical path of the illumination light.

Each of the above embodiments may be modified as follows.

For example, the light source unit 13 may include an LED light source that generates white illumination light, and may also include an optical filter (not shown) disposed in such a manner as to be insertable in and retractable from the optical path of the illumination light emitted from the LED light source.

In accordance with a determination result obtained by the image processor 19 or the emission-condition determination unit 53, the light source controller 31 may insert or retract the optical filter into or from the optical path of the illumination light, so as to switch the optical spectrum of the illumination light. The optical filter used may be, for example, a color filter that only transmits light in the blue region, a low-pass filter, or a band-pass filter.

Although the embodiments of the present invention have been described above in detail with reference to the drawings, specific configurations are not limited to these embodiments, and design modifications are included so long as they do not depart from the scope of the invention. For example, the present invention is not limited to the embodiments and modifications described above, and may be applied to an embodiment obtained by appropriately combining the above embodiments and modifications; the invention is not particularly limited. Furthermore, although a urinary calculus treatment is described as an example in each of the above embodiments, for example, the present invention may be applied to another kind of treatment, such as a biliary calculus treatment.

As a result, the above-described embodiments also lead to the following aspects.

A first aspect of the present invention is directed to an endoscope device including a light source capable of switching an optical spectrum of illumination light, an image acquisition section that acquires an image by receiving reflection light of the illumination light, a determination unit that determines whether or not visibility deterioration has occurred within a visual field of the image acquisition section due to a fragment of a calculus crushed by being irradiated with a laser beam from a laser pulse generator, and a controller that controls the light source based on a determination result obtained by the determination unit. The controller causes the light source to emit white light as the illumination light if the determination unit determines that the visibility deterioration has not occurred, and switches the illumination light emitted from the light source to light in a blue region if the determination unit determines that the visibility deterioration has occurred.

According to this aspect, the light source radiates the illumination light onto an observation area, and the image acquisition section acquires an image of the observation area.

In a case where a calculus is crushed by the laser pulse generator, the visibility of the image acquisition section deteriorates as a result of the illumination light being scattered by calculus fragments. For example, if the illumination light is reflected and scattered by calculus fragments relatively large enough to be viewable with the naked eye, many glittering bright spots form in the image. When the illumination light is back-scattered due to Mie scattering by fine calculus fragments not viewable with the naked eye, the image becomes blurry.

A calculus is often brown or yellow and has low reflectance, as spectral reflectance, with respect to light in the blue region. Furthermore, the intensity of back-scattering due to Mie scattering decreases when the wavelength of the illumination light is shorter than the diameter of each calculus fragment. Therefore, when visibility deterioration has occurred due to calculus fragments, it is desirable to perform the observation by using illumination light in the blue region where the reflectance and the intensity of back-scattering from the calculus fragments are low. On the other hand, since light in the blue region changes the color of the image, it is desirable to perform the observation by using white light if visibility deterioration has not occurred.

Accordingly, if the determination unit determines that visibility deterioration due to calculus fragments has not occurred within the visual field of the image acquisition section, the controller causes the light source to emit white illumination light. If it is determined that visibility deterioration has occurred, the controller causes the light source to emit illumination light in the blue region, thereby ensuring the color of the image during normal observation and ensuring the visibility with a simple operation without increasing the amount of perfusate when visibility deterioration has occurred due to calculus fragments.

In the above aspect, the light in the blue region may be light whose wavelength corresponding to a highest intensity is 500 nm or smaller.

In the above aspect, the determination unit may determine whether or not the visibility deterioration has occurred based on a parameter related to an amount of high-frequency components with a spatial frequency higher than a predetermined frequency in the image. Moreover, the parameter may include frequency spectrum components.

When small glittering bright spots form in the image due to calculus fragments, the brightness signal waveform of the image becomes a waveform having high-frequency noise. Thus, it is possible to determine whether visibility deterioration has occurred based on the parameter related to the amount of high-frequency components in the image.

In the above aspect, the endoscope device may further include a calculator that calculates a ratio between an integrated value of the spatial frequency spectrum components with a frequency higher than the predetermined frequency and an integrated value of the frequency spectrum components with a frequency lower than the predetermined frequency. The determination unit may determine that the visibility deterioration has occurred if the ratio calculated by the calculator is larger than a predetermined threshold value.

The calculator calculates the ratio between the integrated value of the spatial frequency spectrum components with the higher frequency and the integrated value of the frequency spectrum components with the lower frequency, so that it can be determined whether the image contains a large amount of the structure having the high-frequency components or a large amount of the structure having the low-frequency components. If there is a large amount of the structure having the high-frequency components, visibility deterioration occurs. Therefore, by comparing the ratio calculated by the calculator with a predetermined threshold value, it can be accurately determined whether or not visibility deterioration has occurred.

In the above aspect, the determination unit may determine whether or not the visibility deterioration has occurred based on an emission condition of the laser beam emitted from the laser pulse generator.

The size of calculus fragments formed when a calculus is crushed by a laser beam varies depending on an emission condition, such as the output and the pulse width of a laser beam to be radiated. The possibility of the image becoming blurry varies depending on the size of the calculus fragments. Therefore, it is possible to determine whether visibility deterioration has occurred based on the laser-beam emission condition.

In the above aspect, the determination unit may determine that the visibility deterioration has occurred if the emission condition satisfies all of conditional expressions (1) to (3) indicated below:

the laser beam has a wavelength ranging between 1900 nm and 3000 nm (1)

the laser beam has an energy ranging between 200 mJ and 400 mJ (2)

the laser beam has a frequency ranging between 50 Hz and 80 Hz (3)

When the laser-beam emission condition satisfies all of conditional expressions (1) to (3), the calculus can be crushed into relatively small particles. In that case, there is a high possibility that the image may become blurry as a result of the illumination light being back-scattered due to Mie scattering. Therefore, it can be accurately determined whether or not visibility deterioration has occurred based on whether or not the emission condition of the laser beam emitted from the laser pulse generator satisfies all of conditional expressions (1) to (3).

In the above aspect, the light source may include a xenon lamp and an interference filter disposed in such a manner as to be insertable in and retractable from an optical path of the illumination light emitted from the xenon lamp. The controller may switch the optical spectrum of the illumination light by inserting and retracting the interference filter into and from the optical path of the illumination light.

In the configuration using the xenon lamp, the controller simply switches the interference filter between the inserted mode and the retracted mode between when normal observation is to be performed and when visibility deterioration occurs, thereby radiating white illumination light during the normal observation and radiating illumination light in the blue region during the occurrence of visibility deterioration.

In the above aspect, the light source may include a plurality of light-emitting-diode (LED) light sources that emit light beams of different colors, and the controller may switch the optical spectrum of the illumination light by changing the LED light sources to be driven.

According to this configuration, the controller simply changes the LED light sources that are to emit light between when normal observation is to be performed and when visibility deterioration occurs, thereby radiating white illumination light during the normal observation and radiating illumination light in the blue region during the occurrence of visibility deterioration.

In the above aspect, the light source may include an LED light source and an optical filter disposed in such a manner as to be insertable in and retractable from an optical path of the illumination light emitted from the LED light source. The controller may switch the optical spectrum of the illumination light by inserting and retracting the optical filter into and from the optical path of the illumination light.

In the configuration using the LED light source, the controller simply switches the optical filter between the inserted mode and the retracted mode between when normal observation is to be performed and when visibility deterioration occurs, thereby radiating white illumination light during the normal observation and radiating illumination light in the blue region during the occurrence of visibility deterioration.

A second aspect of the present invention is directed to an endoscope system including a laser pulse generator that radiates a laser beam onto a calculus and the aforementioned endoscope device.

In the above aspect, the light in the blue region may be light whose wavelength corresponding to a highest intensity is 500 nm or smaller.

In the above aspect, the determination unit may determine whether or not the visibility deterioration has occurred based on a parameter related to an amount of high-frequency components with a spatial frequency higher than a predetermined frequency in the image.

In the above aspect, the parameter may include frequency spectrum components.

In the above aspect, the endoscope device may further include a calculator that calculates a ratio between an integrated value of the spatial frequency spectrum components with a frequency higher than the predetermined frequency and an integrated value of the frequency spectrum components with a frequency lower than the predetermined frequency. The determination unit may determine that the visibility deterioration has occurred if the ratio calculated by the calculator is larger than a predetermined threshold value.

In the above aspect, the determination unit may determine whether or not the visibility deterioration has occurred based on an emission condition of the laser beam emitted from the laser pulse generator.

In the above aspect, the determination unit may determine that the visibility deterioration has occurred if the emission condition satisfies all of conditional expressions (1) to (3) indicated below:

the laser beam has a wavelength ranging between 1900 nm and 3000 nm (1)

the laser beam has an energy ranging between 200 mJ and 400 mJ (2)

the laser beam has a frequency ranging between 50 Hz and 80 Hz (3)

In the above aspect, the light source may include a xenon lamp and an interference filter disposed in such a manner as to be insertable in and retractable from an optical path of the illumination light emitted from the xenon lamp. The controller may switch the optical spectrum of the illumination light by inserting and retracting the interference filter into and from the optical path of the illumination light.

In the above aspect, the light source may include a plurality of LED light sources that emit light beams of different colors, and the controller may switch the optical spectrum of the illumination light by changing the LED light sources to be driven.

In the above aspect, the light source may include an LED light source and an optical filter disposed in such a manner as to be insertable in and retractable from an optical path of the illumination light emitted from the LED light source. The controller may switch the optical spectrum of the illumination light by inserting and retracting the optical filter into and from the optical path of the illumination light.

The present invention is advantageous in that it can ensure visibility with a simple operation without increasing the amount of perfusate.

REFERENCE SIGNS LIST 1, 51 endoscope system
3 laser pulse generator
5 endoscope device
13 light source unit (light source)
19 image processor (determination unit, calculator)
27 imaging device (image acquisition section)
31 light source controller (controller)
43 interference filter
45 spectrum controller (controller)
53 emission-condition determination unit (determination unit)

The invention claimed is:

1. An endoscope device comprising:
a light source capable of switching an optical spectrum of illumination light;
an imaging device configured to acquire an image by receiving reflection light of the illumination light;
an image processor configured to determine whether or not visibility deterioration has occurred within a visual field of an image acquisition section due to a fragment of a calculus crushed by being irradiated with a laser beam from a laser pulse generator; and
a controller configured to control the light source based on a determination result obtained by the image processor,
wherein the controller causes the light source to emit white light as the illumination light in response to the image processor determining that the visibility deterioration has not occurred, and switches the illumination light emitted from the light source to blue light in a blue region in response to the image processor determining that the visibility deterioration has occurred.

2. The endoscope device according to claim 1, wherein the blue light is light has a wavelength of 500 nm or smaller.

3. The endoscope device according to claim 1, wherein the image processor is configured to determine whether or not the visibility deterioration has occurred based on a parameter of an amount of high-frequency components with a frequency higher than a predetermined frequency in the image.

4. The endoscope device according to claim 3, wherein the parameter comprises frequency spectrum components.

5. The endoscope device according to claim 4,
wherein the image processor is further configured to calculate a ratio between an integrated value of the frequency spectrum components with a frequency higher than the predetermined frequency and an integrated value of the frequency spectrum components with a frequency lower than the predetermined frequency,
wherein the image processor is configured to determine that the visibility deterioration has occurred if the calculated ratio is larger than a predetermined threshold value.

6. The endoscope device according to claim 1, wherein the image processor is configured to determine whether or not the visibility deterioration has occurred based on an emission condition of the laser beam emitted from the laser pulse generator.

7. The endoscope device according to claim 6, wherein the image processor is configured to determine that the visibility deterioration has occurred if the emission condition satisfies all of conditional expressions (1) to (3) indicated below:
(1) the laser beam has a wavelength ranging between 1900 nm and 3000 nm;
(2) the laser beam has an energy ranging between 200 mJ and 400 mJ; and
(3) the laser beam has a frequency ranging between 50 Hz and 80 Hz.

8. The endoscope device according to claim 1,
wherein the light source comprises a xenon lamp and an interference filter disposed in such a manner as to be insertable in and retractable from an optical path of the illumination light emitted from the xenon lamp, and
wherein the controller switches the optical spectrum of the illumination light by inserting and retracting the interference filter into and from the optical path of the illumination light.

9. The endoscope device according to claim 1,
wherein the light source comprises a plurality of light-emitting-diode light sources that emit light beams of different colors, and
wherein the controller switches the optical spectrum of the illumination light by changing the light-emitting-diode light sources.

10. The endoscope device according to claim 1,
wherein the light source comprises a light-emitting-diode light source and an optical filter disposed in such a manner as to be insertable in and retractable from an optical path of the illumination light emitted from the light-emitting-diode light source, and
wherein the controller switches an optical spectrum of the illumination light by inserting and retracting the optical filter into and from the optical path of the illumination light.

11. An endoscope system comprising:
a laser pulse generator configured to radiate a laser beam onto a calculus; and
an endoscope device comprising:
    a light source capable of switching an optical spectrum of illumination light;
    an imaging device configured to acquire an image by receiving reflection light of the optical spectrum of illumination light;
    an image processor configured to determine whether or not visibility deterioration has occurred within a visual field of an image acquisition section due to a fragment of a calculus crushed by being irradiated with a laser beam from a laser pulse generator; and
    a controller configured to control the light source based on a determination result obtained by the image processor, wherein the controller causes the light source to emit white light as the optical spectrum of illumination light in response to the image processor determining that the visibility deterioration has not occurred, and switches the optical spectrum of illumination light emitted from the light source to blue light in response to the image processor determining that the visibility deterioration has occurred.

12. The endoscope system according to claim 11, wherein the blue light has a wavelength of 500 nm or smaller.

13. The endoscope system according to claim 11, wherein the image processor is configured to determine whether or not the visibility deterioration has occurred based on a parameter related to an amount of high-frequency components with a frequency higher than a predetermined frequency in the image.

14. The endoscope system according to claim 13, wherein the parameter comprises frequency spectrum components.

15. The endoscope system according to claim 14,
wherein the image processor is further configured to calculate a ratio between an integrated value of the frequency spectrum components with a frequency higher than the predetermined frequency and an integrated value of the frequency spectrum components with a frequency lower than the predetermined frequency,
wherein the image processor is configured to determine that the visibility deterioration has occurred if the calculated ratio is larger than a predetermined threshold value.

16. The endoscope system according to claim 11, wherein the image processor is configured to determine whether or not the visibility deterioration has occurred based on an emission condition of the laser beam emitted from the laser pulse generator.

17. The endoscope system according to claim 16, wherein the image processor is configured to determine that the visibility deterioration has occurred if the emission condition satisfies all of conditional expressions (1) to (3) indicated below:
   (1) the laser beam has a wavelength ranging between 1900 nm and 3000 nm;
   (2) the laser beam has an energy ranging between 200 mJ and 400 mJ; and
   (3) the laser beam has a frequency ranging between 50 Hz and 80 Hz.

18. The endoscope system according to claim 11,
wherein the light source comprises a xenon lamp and an interference filter disposed in such a manner as to be insertable in and retractable from an optical path of the illumination light emitted from the xenon lamp, and
wherein the controller switches the optical spectrum of the illumination light by inserting and retracting the interference filter into and from the optical path of the illumination light.

19. The endoscope system according to claim 11,
wherein the light source comprises a plurality of light-emitting-diode light sources that emit light beams of different colors, and
wherein the controller switches the optical spectrum of the illumination light by changing the light-emitting-diode light sources to be driven.

20. The endoscope system according to claim 11,
wherein the light source comprises a light-emitting-diode light source and an optical filter disposed in such a manner as to be insertable in and retractable from an optical path of the illumination light emitted from the light-emitting-diode light source, and
wherein the controller switches the optical spectrum of the illumination light by inserting and retracting the optical filter into and from the optical path of the illumination light.

* * * * *